United States Patent
Bernal

(10) Patent No.: US 12,425,207 B2
(45) Date of Patent: Sep. 23, 2025

(54) MUSICAL INSTRUMENT DIGITAL INTERFACE ENCRYPTION AND COMPRESSION

(71) Applicant: Rodolfo J. Bernal, Fredericksburg, VA (US)

(72) Inventor: Rodolfo J. Bernal, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 98 days.

(21) Appl. No.: 18/396,824

(22) Filed: Dec. 27, 2023

(65) Prior Publication Data

US 2025/0219815 A1    Jul. 3, 2025

(51) Int. Cl.
*H04L 9/08*     (2006.01)
*G10H 1/00*     (2006.01)

(52) U.S. Cl.
CPC ......... *H04L 9/0869* (2013.01); *G10H 1/0025* (2013.01); *G10H 1/0066* (2013.01); *G10H 2210/115* (2013.01); *G10H 2210/555* (2013.01); *G10H 2240/026* (2013.01); *G10H 2240/311* (2013.01)

(58) Field of Classification Search
None
See application file for complete search history.

(56) References Cited

U.S. PATENT DOCUMENTS

| | | | | |
|---|---|---|---|---|
| 5,484,291 A * | 1/1996 | Nakai | .................... | G09B 15/00 84/610 |
| 6,611,537 B1 * | 8/2003 | Edens | ................ | H04N 21/4363 375/E7.274 |
| 2002/0134216 A1 * | 9/2002 | Shibukawa | .......... | G09B 15/026 84/478 |
| 2003/0070538 A1 * | 4/2003 | Sugiyama | ............ | G10H 1/0066 84/645 |
| 2004/0144236 A1 * | 7/2004 | Hiratsuka | ................ | G06F 21/10 84/609 |
| 2004/0255755 A1 * | 12/2004 | Kestenbaum | .......... | G09B 15/02 84/483.2 |
| 2021/0287643 A1 * | 9/2021 | Qiu | ....................... | G06T 11/001 |

\* cited by examiner

*Primary Examiner* — Anh Nguyen
(74) *Attorney, Agent, or Firm* — NSWCDD Office of Counsel

(57) ABSTRACT

A computer implemented method for encrypting and decrypting a graphic or message as musical notes. The method includes generating a composition key, selecting a graphic or message to be encrypted, identifying a color associated with each pixel within the graphic or message, ranking each color by order of its prevalence within the graphic or message, assigning a note to each color in a music tool as determined by the composition key, and saving the notes to a file.

15 Claims, 6 Drawing Sheets

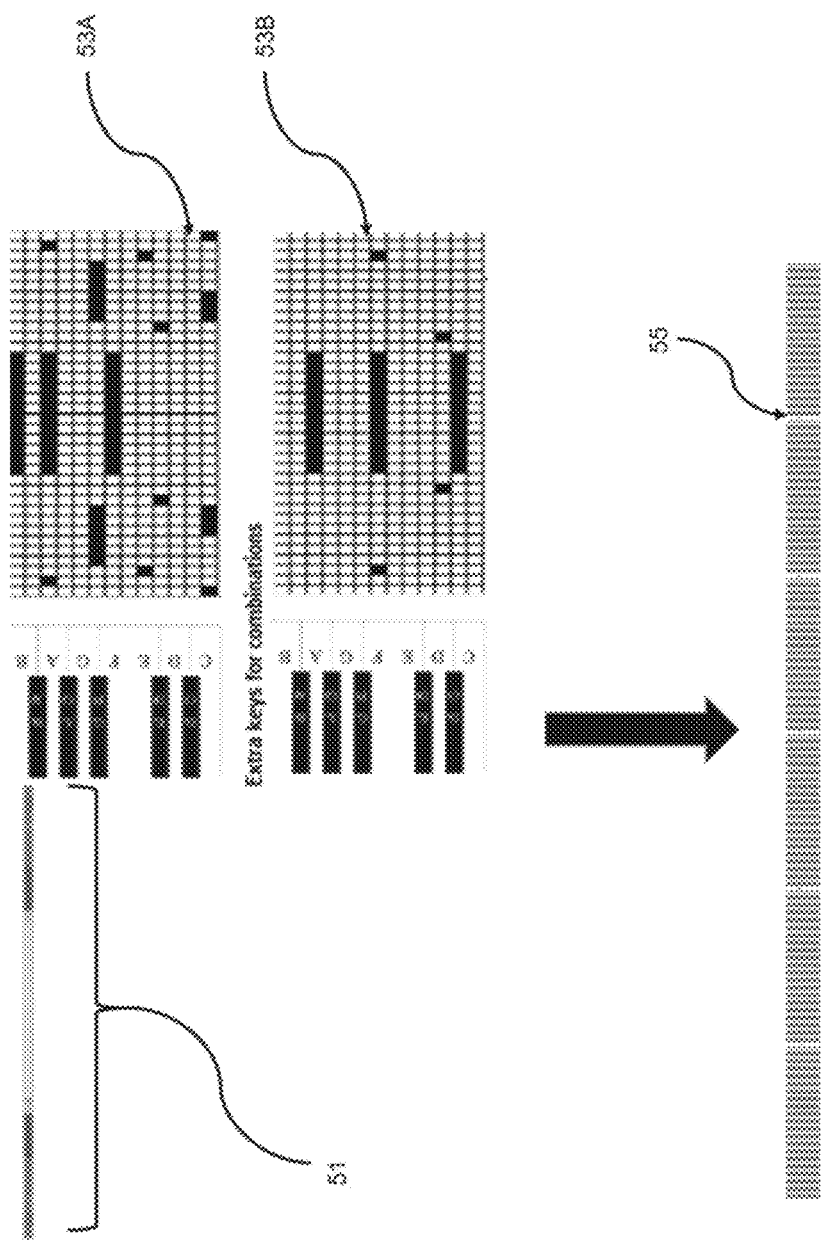

MUSICAL INSTRUMENT DIGITAL INTERFACE ENCRYPTION AND COMPRESSION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to encryption. In particular, the use of musical tools to generate an encrypted file.

SUMMARY

The present disclosure relates, in various embodiments, to a computer implemented method for encrypting and decrypting a graphic or message as musical notes. The method includes generating a composition key, selecting a graphic or message to be encrypted, identifying a color associated with each pixel within the graphic or message, ranking each color by order of its prevalence within the graphic or message, assigning a note to each color in a music tool as determined by the composition key, and saving the notes to a file. In some embodiments, wherein assigning a note to each color further comprises assigning a null to a color with the highest prevalence. In some embodiments, when the number of colors exceeds the number of notes, assigning a combination of notes to each remaining color as determined by the composition key. In some embodiments, further includes sending the file, receiving the file, receiving the composition key, and decoding the graphic or message by using the composition key. In some embodiments, the composition key is randomly generated. In some embodiments, music is used to generate the composition key. In some embodiments, further includes adding a 17th channel to the music tool to increase the number or colors that may be encrypted. In some embodiments, further includes adding a 17th channel to the music tool when the colors of the graphic or message exceeds the number of colors provided for in 16 channels.

In other embodiments, a computer implemented music tool for encrypting and decrypting a graphic or message as musical notes, the music tool comprising at least 17 channels is disclosed.

In other embodiments, a computer-implemented system includes one or more computers, and one or more computer memory devices interoperably coupled with the one or more computers and having tangible, non-transitory, machine-readable media storing instructions that, when executed by the one or more computers, cause the one or more computers to perform operations including generating, by one of the computers, a composition key, selecting, by one of the computers, a graphic or message to be encrypted, identifying, by one of the computers, a color associated with each pixel within the graphic or message, ranking, by one of the computers, each color by order of its prevalence within the graphic or message, assigning, by one of the computers, a note to each color in a music tool as determined by the composition key, and saving, by one of the computers, the notes to a file. In some embodiments, assigning a note to each color further includes assigning a null to a color with the highest prevalence. In some embodiments, further includes, when the number of colors exceeds the number of notes, assigning a combination of notes to each remaining color as determined by the composition key. In some embodiments, further includes sending, by one of the computers, the file, receiving, by one of the computers, the file, receiving, by one of the computers, the composition key, and decoding, by one of the computers, the graphic or message by using the composition key. In some embodiments, the composition key is randomly generated, by one of the computers. In some embodiments, wherein music is used to generate, by one of the computers, the composition key. In some embodiments, further includes adding a 17th channel to the music tool to increase the number or colors that may be encrypted.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 3A-B show another exemplary application of the disclosed method.

DETAILED DESCRIPTION

Figure 1A:
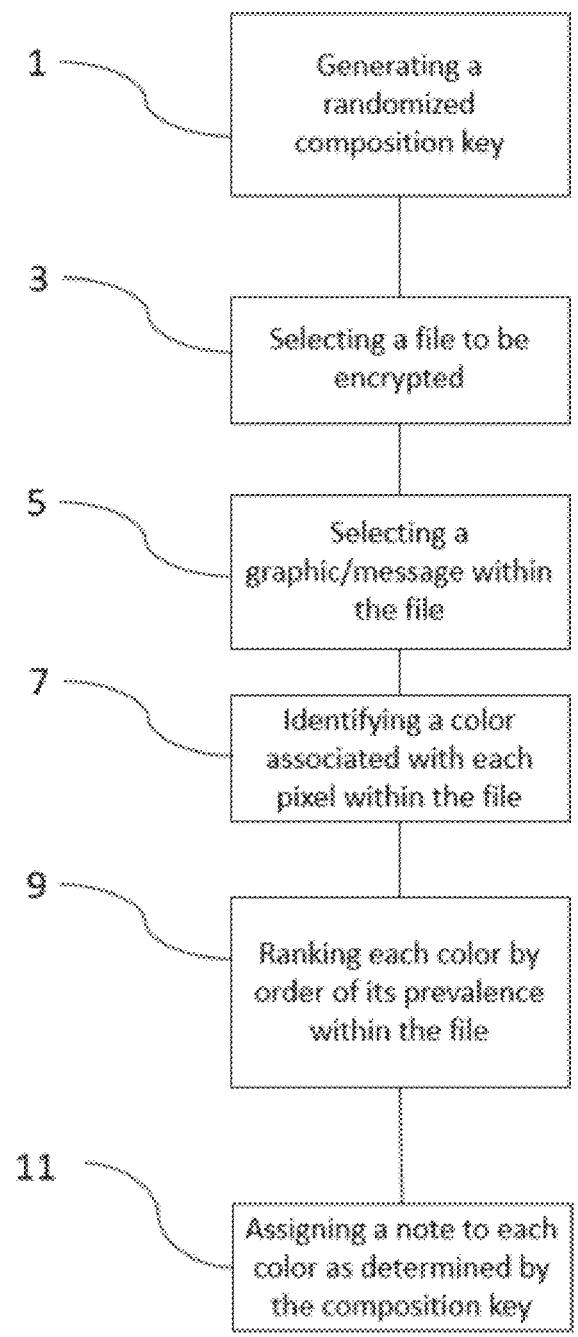
FIGS. 1A-B discloses a method of encrypting a file.
Figure 1B:
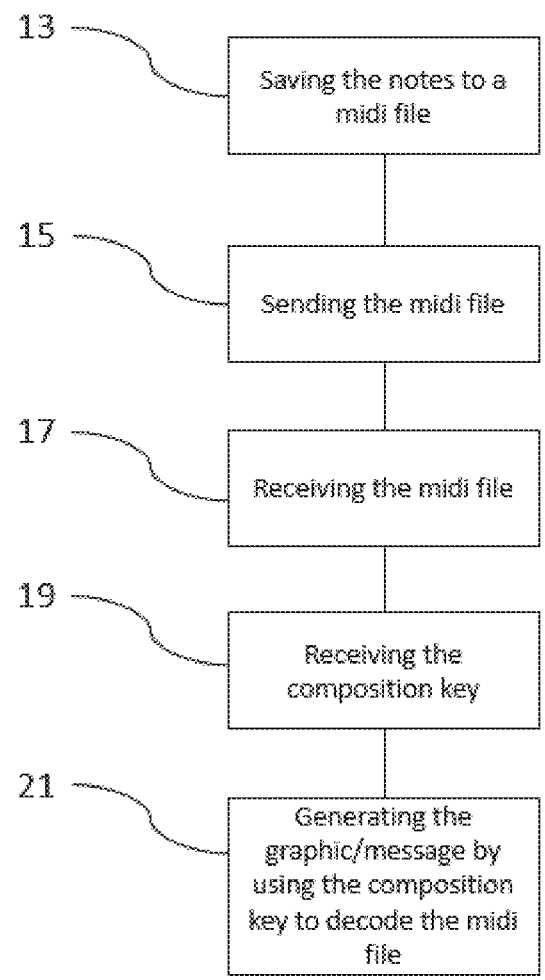

FIG. 1 shows a method of data encryption and compression using a communications protocol. The communication protocol can transmit notation, pitch and velocity, control signals for parameters such as volume, vibrato, panning, cues, and clock signals that set and synchronize tempo between multiple devices. One such protocol is Musical Instrument Digital Interface (MIDI).

In block 1, a randomized composition key is generated. The MIDI notation is unreadable without the composition key. A composition key is a musical encryption key. In some systems, a randomized encryption key is generated by collecting random data. In the disclosed method, the random data is music. Music is a good source of random data because music is highly variable and can change often. The length and complexity of the composition key depends on the level of security desired. The composition key may use either a symmetric encryption or asymmetric encryption. In block 3, the method selects a file to be encrypted. The image may be selected by user or by a computer using artificial intelligence or machine learning. In block 5, a graphic/message within the file is selected for encryption. In block 7, a color associated with each pixel within the file. In block 9, each color is ranked by order of its prevalence within the file.

In block 11, the method assigns a note to each color as determined by the composition key. The composition key is used to convert the image into MIDI notation. If the number of colors exceeds the number of notes, a combination of notes is assigned to each remaining color as determined by the composition key. All the keys being hit are just seen as standard midi color (Black or whatever is selected in the Producer Tools or MIDI palette.) In some instances when file compression is important, the most common color is given the null key. In other words, the most common color is not assigned a note. The more a graphic has as its background color (no keys hit) with the combination of the sustained keys, the smaller amount of space the graphic takes up when rendered as a MIDI file. Essentially, the most prevalent color in the image is assigned a null (no key) to minimize the size of the MIDI file. In block 13, the data is saved to a midi file. In block 15, the midi file is sent to a recipient. In block 17, the midi file is received. In block 15, the composition key is received. Usually, the composition key is sent separately from the encrypted MIDI file. In block 15, the graphic/message is generated by using the composition key to decode the midi file.

Preliminarily, a standard MIDI file includes only 16 channels and the RGB pallet includes 256^3 colors (16777216) because R: 0-255; G: 0-255; and B: 0-255. To provide sufficient notes, a $17^{th}$ channel or one additional channel for the midi set up is required to match all the colors in the RGB pallet to the number of combination keys provided by this MIDI setup. In other words, if each channel has 10 Octaves with 12 semitones in each and an additional channel that would mean 24 keys per octave to code the colors to. The combination of keys results as follows:

| | |
|---|---|
| 1 | 24 |
| 2 | 276 |
| 3 | 2024 |
| 4 | 10626 |
| 5 | 42504 |
| 6 | 134596 |
| 7 | 346104 |
| 8 | 735471 |
| 9 | 1307504 |
| 10 | 1961256 |
| 11 | 2496144 |
| 12 | 2704156 |
| 13 | 2496144 |
| 14 | 1961256 |
| 15 | 1307504 |
| 16 | 735471 |
| 17 | 346104 |
| 18 | 134596 |
| 19 | 42504 |
| 20 | 10626 |
| 21 | 2024 |
| 22 | 276 |
| 23 | 24 |
| 24 | 1 |
| Total | 16777215 |

Including the null key the total possible combination of keys is 16777216 which matches the RGB color pallet. Accordingly, a 1 to 1 color palette can be generated using the possible combination of keys.

Figure 2A:
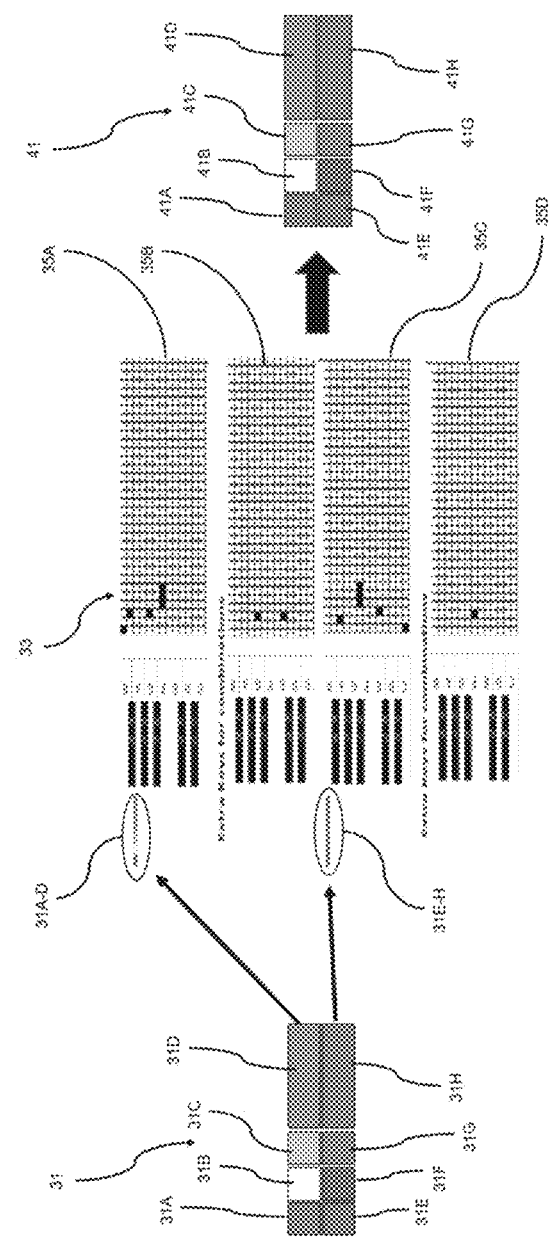
FIGS. 2A-B shows an exemplary application of the disclosed method.
Figure 2B:
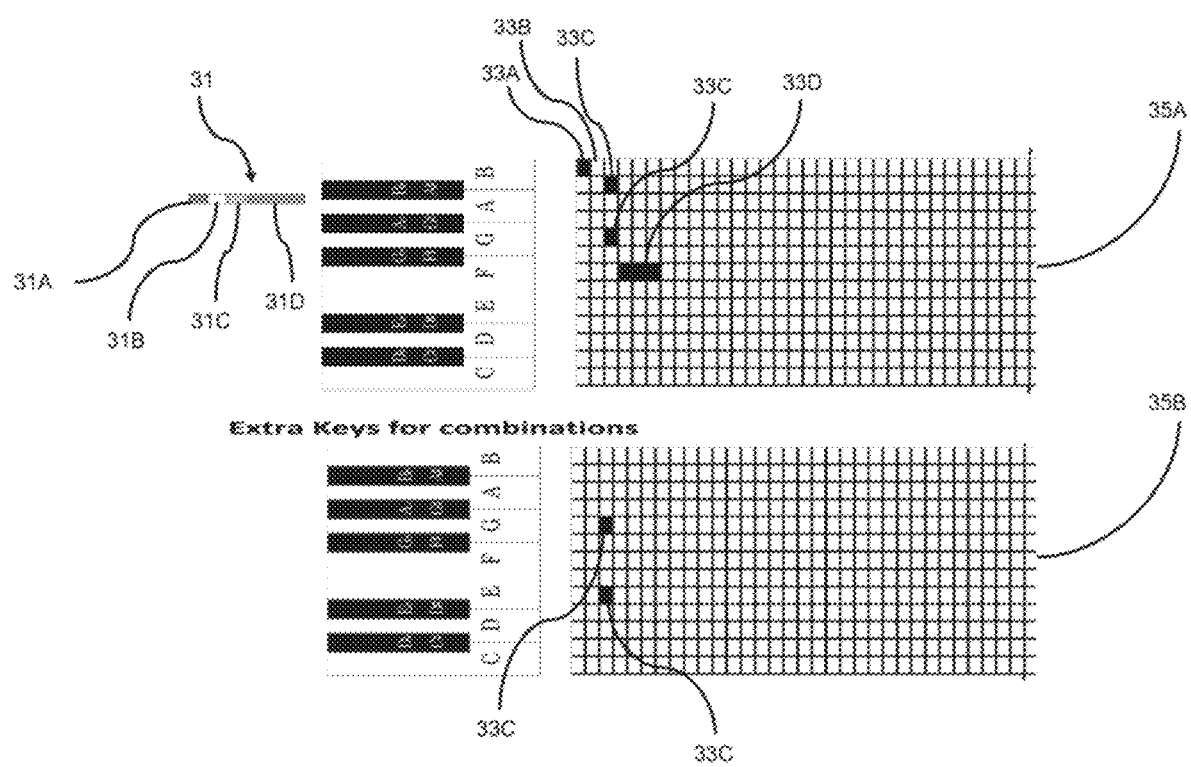

FIGS. 2A-B show an exemplary application of the disclosed method. FIG. 2A shows a portion of an image 31 comprised of 12 pixels of eight colors in two rows. In the first row 31A-D, pixel 31A is red, pixel 31B is white, pixel 31C is aqua, and pixel 31D is orange. In the second row 31E-H, pixel 31E is yellow, pixel 31F is light blue, pixel 31G is brown, and pixel 31H is dark blue (All colors discussed are shown in the figures in black and white and are exemplary). The method at block 9 (FIG. 1) ranked the colors and determined that the most prevalent color in the whole image (not shown) is white. In many cases, the most prevalent color in an image is the background color. In block 11 (FIG. 1), the method assigns each of the colors 31A-H a key on the MIDI file 33 according to the composition key generated in block 1 (FIG. 1). In this instance, each row 31A-D, 31E-H of the image is translated to MIDI notation and stored as MIDI file 35A-D. The resulting MIDI file 35A-D is decoded and results in an image 41 identical to the original image 31. As further shown in FIG. 2A, a first set of keys 35A, 35C and an extra set of keys 35B, 35D are used to generate the full color pallet required.

As shown in FIG. 2B, image row 31 comprises colors 31A-D. Here, pixel 31A is assigned "B" key 33 on the Octave according to the composition key generated (block 1). Pixel 31B is assigned a null (no key) 33B because, as discussed above, the method determined white is the most prevalent color in the image. Thus, since it is the most prevalent color assigning it null for the greatest compression of the final MIDI file. Blue 31C is assigned a 1 to 1 combination of 4 keys by the composition key, in this case A #, G, G and E (on extra octave keys) 33C. As seen here, pixel 31C requires the use of the extra keys. Orange 31D is assigned the "F" key 33D. As shown, key 33D is 3 times longer than 33A-C because 33A-C are connected that take only 1 pixel/hit each. Accordingly, key 33D is sustained for 3 consecutive hits.

Figure 3B:
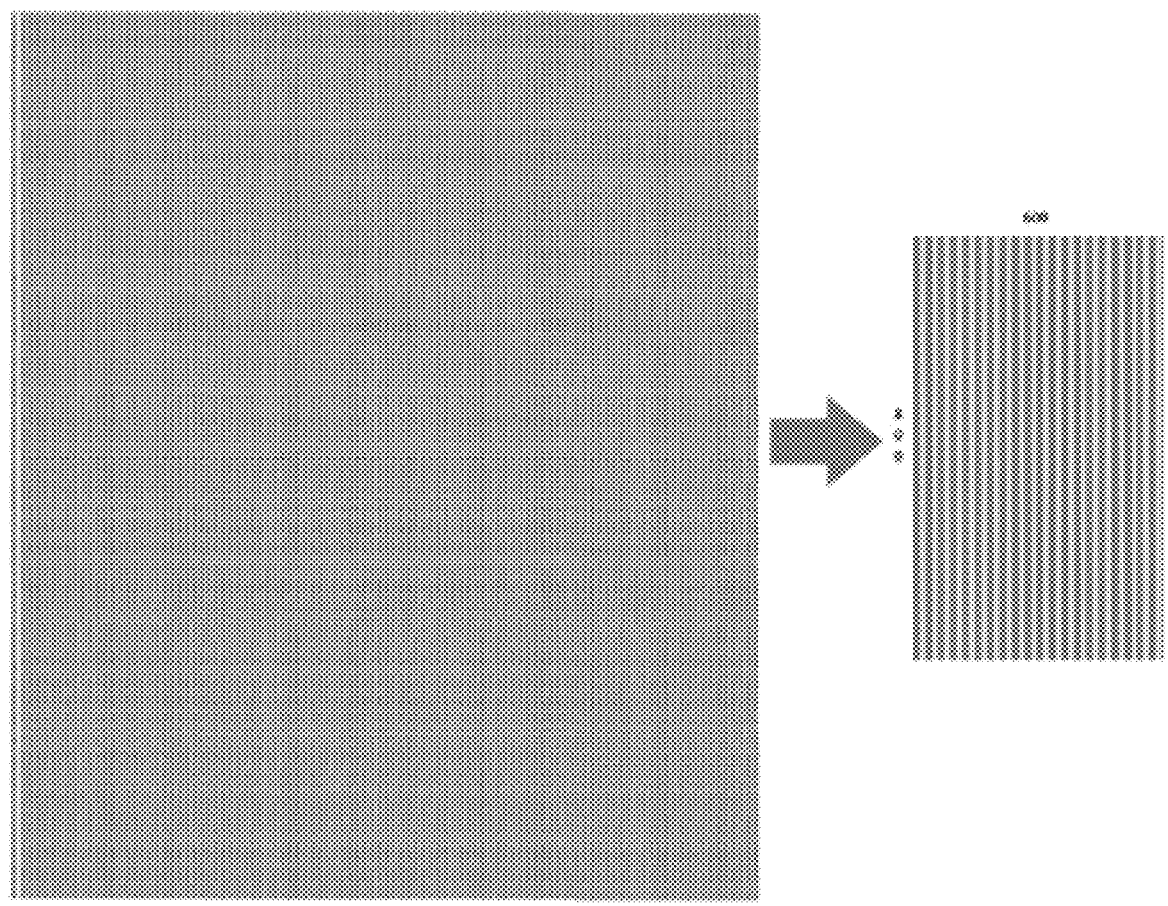

FIGS. 3A-B show an exemplary application of the disclosed method. FIG. 3A shows an image 51 consisting of a series of pixels of different colors (the colors will not be discussed in this example). The pixels of image 51 is then assigned a series of notes 53 according to block 11. Then the resulting composition is saved as a midi file 55 according to block 13. Assuming that a 600×800 graphic contained the previous set pattern for all 10 octaves per channel with 16 channels, FIG. 3A shows how each set of 4.6875 measures (being equal to 600 hits/pixels) can be generated using the key combinations for only the ¼ measure as a set pattern, for all 10 octaves, for each of the 16 channels, just over 29 measures. 6.25 times. FIG. 3B representation of what the midi sequence and stacked set of measures would look like, making a 600×800 graphic.

Randomizing the generation of the MIDI sequence with Producer Tools is important for how the graphic is generated. An algorithm can be made to select the primary octave (1st octave used) to the last octave used per channel. The same can be done with the measures. In other words, instead of the octaves starting from the highest to the lowest being the 1st pixel to the 10th pixel going down, one could select the order of the octaves/measures/channels to be to the preference of the composer/user. With the use of such inputs, a matrix can be made and manipulated and sent to the receiving party to be used as a decoder key if needed.

Different inputs would include: Palette, Tempo, Primary color, Pitch, Volume, Pan, Key Combo, Primary Measure, Channel order, Measure break. Those would only tell you different inputs needed to unlock the sequence made.

| | Palette | Primary color | Pitch | Volume | Pan | Channel order | Primary Measure | Measure break |
|---|---|---|---|---|---|---|---|---|
| 1 | 1 | 0 | 0 | 0 | 0 | 2 | 2 | 16 |
| 2 | 1 | 0 | 0 | 0 | 0 | 7 | 2 | 16 |
| 3 | 1 | 0 | 0 | 0 | 0 | 15 | 2 | 16 |
| 4 | 1 | 0 | 0 | 0 | 0 | 5 | 2 | 16 |
| 5 | 1 | 0 | 0 | 0 | 0 | 12 | 2 | 16 |
| 6 | 1 | 0 | 0 | 0 | 0 | 4 | 2 | 16 |

| | Palette | Primary color | Pitch | Volume | Pan | Channel order | Primary Measure | Measure break |
|---|---|---|---|---|---|---|---|---|
| 7 | 1 | 0 | 0 | 0 | 0 | 9 | 2 | 16 |
| 8 | 1 | 0 | 0 | 0 | 0 | 14 | 2 | 16 |
| 9 | 1 | 0 | 0 | 0 | 0 | 1 | 2 | 16 |
| 10 | 1 | 0 | 0 | 0 | 0 | 6 | 2 | 16 |
| 11 | 1 | 0 | 0 | 0 | 0 | 13 | 2 | 16 |
| 12 | 1 | 0 | 0 | 0 | 0 | 10 | 2 | 16 |
| 13 | 1 | 0 | 0 | 0 | 0 | 8 | 2 | 16 |
| 14 | 1 | 0 | 0 | 0 | 0 | 3 | 2 | 16 |
| 15 | 1 | 0 | 0 | 0 | 0 | 16 | 2 | 16 |
| 16 | 1 | 0 | 0 | 0 | 0 | 11 | 2 | 16 |

The matrix above shows that 1 Palette would be used for color selection, the primary color is the 0 selection of that palette, No Pitch, Volume, or Pan is needed. The order of the channels, along with the primary measure and measure break for each. Once the inputs are taken from the Matrix, the MIDI file will appear but without the decipher algorithms to output the MIDI to Graphic, there would only be notes/hits within channels.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer implemented method for encrypting and decrypting a graphic or message as musical notes, the method comprising:
   generating a composition key;
   selecting a graphic or message to be encrypted;
   identifying a color associated with each pixel within the graphic or message;
   ranking each color by order of its prevalence within the graphic or message;
   assigning a note to each color in a music tool as determined by the composition key; and
   saving the notes to a file.

2. The method of claim 1, wherein assigning a note to each color further comprises assigning a null to a color with the highest prevalence.

3. The method of claim 1, further comprising:
   when the number of colors exceeds the number of notes, assigning a combination of notes to each remaining color as determined by the composition key.

4. The method of claim 1, further comprising:
   sending the file;
   receiving the file;
   receiving the composition key; and
   decoding the graphic or message by using the composition key.

5. The method of claim 1, wherein the composition key is randomly generated.

6. The method of claim 1, wherein music is used to generate the composition key.

7. The method of claim 1, further comprising:
   adding a 17th channel to the music tool to increase the number or colors that may be encrypted.

8. The method of claim 1, further comprising:
   adding a 17th channel to the music tool when the colors of the graphic or message exceeds the number of colors provided for in 16 channels.

9. A computer-implemented system, comprising:
   one or more computers; and
   one or more computer memory devices interoperably coupled with the one or more computers and having tangible, non-transitory, machine readable media storing instructions that, when executed by the one or more computers, cause the one or more computers to perform operations comprising:
   generating, by one of the computers, a composition key;
   selecting, by one of the computers, a graphic or message to be encrypted;
   identifying, by one of the computers, a color associated with each pixel within the graphic or message;
   ranking, by one of the computers, each color by order of its prevalence within the graphic or message;
   assigning, by one of the computers, a note to each color in a music tool as determined by the composition key; and
   saving, by one of the computers, the notes to a file.

10. The system of claim 9, wherein assigning a note to each color further comprises assigning a null to a color with the highest prevalence.

11. The system of claim 9, further comprising:
   when the number of colors exceeds the number of notes, assigning a combination of notes to each remaining color as determined by the composition key.

12. The system of claim 9, further comprising:
   sending, by one of the computers, the file;
   receiving, by one of the computers, the file;
   receiving, by one of the computers, the composition key; and
   decoding, by one of the computers, the graphic or message by using the composition key.

13. The system of claim 9, wherein the composition key is randomly generated, by one of the computers.

14. The system of claim 9, wherein music is used to generate, by one of the computers, the composition key.

15. The system of claim 9, further comprising:
   adding a 17th channel to the music tool to increase the number or colors that may be encrypted.

* * * * *